United States Patent
Urushihara

(10) Patent No.: US 10,629,858 B2
(45) Date of Patent: Apr. 21, 2020

(54) SEALING BODY OF TUBE-SHAPED BATTERY AND TUBE-SHAPED BATTERY

(71) Applicant: FDK CORPORATION, Tokyo (JP)

(72) Inventor: Kanji Urushihara, Tokyo (JP)

(73) Assignee: FDK CORPORATION, Tokyo (JP)

(*) Notice: Subject to any disclaimer, the term of this patent is extended or adjusted under 35 U.S.C. 154(b) by 326 days.

(21) Appl. No.: 15/872,994

(22) Filed: Jan. 17, 2018

(65) Prior Publication Data

US 2018/0205044 A1 Jul. 19, 2018

(30) Foreign Application Priority Data

Jan. 17, 2017 (JP) .................................. 2017-005731

(51) Int. Cl.
*H01M 2/02* (2006.01)
*H01M 2/04* (2006.01)
(Continued)

(52) U.S. Cl.
CPC ........... *H01M 2/022* (2013.01); *H01M 2/024* (2013.01); *H01M 2/027* (2013.01);
(Continued)

(58) Field of Classification Search
CPC .... H01M 2/022; H01M 2/046; H01M 2/0482; H01M 2/0486; H01M 2/30; H01M 2/0285; H01M 2/027; H01M 2/024; H01M 2/0426; H01M 2/0232; H01M 2/08; H01M 2/22; H01M 2/06; H01M 4/669; H01M 4/405; H01M 4/06; H01M 2220/30; H01M 10/052
See application file for complete search history.

(56) References Cited

U.S. PATENT DOCUMENTS 3,793,087 A * 2/1974 Blandford ............... H01M 2/06
219/148
2001/0004505 A1* 6/2001 Kim ................... H01M 2/0473
429/180
(Continued)

FOREIGN PATENT DOCUMENTS

JP 2016038991 A 3/2016

*Primary Examiner* — Ula C Ruddock
*Assistant Examiner* — Matthew W Van Oudenaren
(74) *Attorney, Agent, or Firm* — Isshiki International Law Office; Joseph P. Farrar, Esq.

(57) ABSTRACT

A sealing body for sealing an upper opening of a battery can having a tube shape with a closed bottom includes an electrode terminal, a sealing plate, and gaskets. The electrode terminal includes a flat plate-shaped stepped portion in an area of a lower surface of a flat plate-shaped terminal portion. The electrode terminal has an inserting portion extending downward in a columnar shape on a lower surface of the stepped portion, and a protrusion in a non-circular planar shape that goes around the inserting portion. The sealing plate has an opening, and has an upper surface and a lower surface on which a non-circular sealing-plate recessed portion and a sealing-plate protruding portion are formed. The gaskets have a shaft portion inserted through the opening of the sealing plate, and a protruding portion that engages the sealing-plate recessed portion and a recessed portion that engages the sealing-plate protruding portion.

9 Claims, 7 Drawing Sheets

(51) Int. Cl.
*H01M 2/30* (2006.01)
*H01M 4/06* (2006.01)
*H01M 4/40* (2006.01)
*H01M 4/66* (2006.01)
*H01M 6/16* (2006.01)
H01M 2/22 (2006.01)
H01M 2/08 (2006.01)
H01M 2/06 (2006.01)

(52) U.S. Cl.
CPC ....... *H01M 2/0285* (2013.01); *H01M 2/0486* (2013.01); *H01M 2/30* (2013.01); *H01M 4/06* (2013.01); *H01M 4/405* (2013.01); *H01M 4/669* (2013.01); *H01M 6/16* (2013.01); H01M 2/0232 (2013.01); H01M 2/04 (2013.01); H01M 2/046 (2013.01); H01M 2/0417 (2013.01); H01M 2/0426 (2013.01); H01M 2/0482 (2013.01); H01M 2/06 (2013.01); H01M 2/08 (2013.01); H01M 2/22 (2013.01); H01M 2220/30 (2013.01)

(56) References Cited

U.S. PATENT DOCUMENTS

2006/0141355 A1\* 6/2006 Kang ................. H01M 2/0404
429/182
2016/0043356 A1 2/2016 Sunada et al.

\* cited by examiner

SEALING BODY OF TUBE-SHAPED BATTERY AND TUBE-SHAPED BATTERY

CROSS-REFERENCE TO RELATED APPLICATION

The present application claims priority pursuant to 35 U.S.C. § 119 Japanese Patent Application No. 2017-005731 filed on Jan. 17, 2017 in the Japan Patent Office, the entire disclosure of which is hereby incorporated by reference herein.

TECHNICAL FIELD

This disclosure relates to a sealing body of a tube-shaped battery and the tube-shaped battery.

BACKGROUND ART

The tube-shaped battery is used as a power source of various electronic devices such as a laptop personal computer and a digital camera. In a general tube-shaped battery, a power generating element including an electrolyte is housed in a battery can having a tube shape with a closed bottom which doubles as positive or negative electrode current collector. Needless to say, a high sealability that can surely prevent leakage of contents is required for the tube-shaped battery. In the tube-shaped battery, a configuration that seals an opening of the battery can to seal an inside of the battery can is a sealing body. The sealing body basically has a structure where an electrode terminal in a state electrically insulated is mounted on a metallic sealing plate that will be a lid of the battery-can opening.

FIG. 6 is a view illustrating a general sealing structure in a tube-shaped battery 101. FIG. 6 is a partially enlarged view of a vertical cross section of a cylindrical battery 101 cut in a planar surface including a cylinder axis 100 in which the cylindrical battery 101 is formed such that an opening 12 of a cylindrically-shaped battery can 2 that serves both as a current collector of any one of positive and negative electrodes is sealed with a sealing body 110 (hereinafter referred to as the sealing body 110 according to a conventional example). In the following, an extending direction of the cylinder axis 100 is referred to as an up-down direction, and the up and down directions are specified having the opening 12 of the battery can 2 as an upper side. The sealing body 110 according to the conventional example is configured including a circular plate-shaped metallic sealing plate (hereinafter referred to as a sealing plate 120), a terminal of the other electrode (hereinafter referred to as an electrode terminal 130), a metallic washer (hereinafter referred to as a washer 140), and a gasket 150 made of a resin having an electrical insulating property.

FIG. 7 is a perspective view of when the electrode terminal 130 is viewed from below. As illustrated in FIG. 7, the electrode terminal 130 is formed such that a column-shaped inserting portion 132 to be coaxial with a circular plate-shaped terminal portion 131 is provided to protrude to a lower surface 133 of this terminal portion 131 to extend downward. On the lower surface 133 of the terminal portion 131, a protrusion 136 whose planar shape is annular is formed to be coaxial with the inserting portion 132.

FIG. 8 is a vertical cross-sectional view of when the sealing body 110 according to the conventional example is disassembled. The sealing plate 120 is a circular plate-shape and has a circular opening 121 at the center, and the edge bends upward to form a peripheral-edge folded portion 122.

The washer 140 is a simple circular plate-shape, and has a circular opening 141 in the center. The gasket 150 has a structure where circular plate parts (152a and 152b) in surface contact with each of an upper surface 123 and a lower surface 124 of the sealing plate 120 communicate with one another via a shaft portion 153 having a hollow cylindrical shape. The gasket 150 illustrated here is configured from an upper gasket 150a in surface contact with the upper surface 123 of the sealing plate 120, and a lower gasket 150b in surface contact with the lower surface 124 of the sealing plate 120. The upper gasket 150a is formed such that a circular plate portion 152a (hereinafter referred to as an upper circular plate portion 152a) having a lower surface 157a in surface contact with the upper surface 123 of the sealing plate 120, and the shaft portion 153 are integrally molded. On the upper gasket 150a, a hole 151a that penetrates from an upper surface 155a of the upper circular plate portion 152a through an inside of the shaft portion 153 to a lower end surface 156 of this shaft portion 153 is formed.

On the other hand, the lower gasket 150b has a sidewall portion 154 vertically disposed downward in the periphery of a circular plate portion 152b (hereinafter referred to as a lower circular plate portion 152b) in surface contact with the lower surface 124 of the sealing plate 120. The lower gasket 150b is integrally molded into a flat cup shape having the lower circular plate portion 152b as a bottom portion. The lower circular plate portion 152b is formed in the center with a circular opening 151b that communicates with an upper surface 157b and a lower surface 155b.

To assemble the integral sealing body 110 using the above-described respective components (the sealing plate 120, the washer 140, the upper gasket 150a, and the lower gasket 150b) and the electrode terminal 130, first, the shaft portion 153 of the upper gasket 150a is inserted through the opening 121 of the sealing plate 120 in a fitting state, and the inserting portion 132 of the electrode terminal 130 is inserted through the hole 151a of the upper gasket 150a, the opening 151b of the lower gasket 150b, and the opening 141 of the washer 140 in order in the fitting state. Next, a part between an upper surface 134 of the electrode terminal 130 and a lower end surface 135 of the inserting portion 132 is pressed in a direction of the axis 100 to deform the inserting portion 132 in a diameter expanding direction. This crimps the respective members (the upper gasket 150a, the sealing plate 120, the lower gasket 150b, and the washer 140) between the lower surface 133 of terminal portion 131 of the electrode terminal 130 and the lower end surface 135 of the inserting portion 132. Thus, the shaft portion 153 of the upper gasket 150a is compressed between an inner surface of the opening 121 of the sealing plate 120 and an outer peripheral surface of the inserting portion 132 to fit the shaft portion 153 to the sealing plate 120. The protrusion 136 provided to protrude to the lower surface 133 of the terminal portion 131 in the electrode terminal 130 digs into the upper surface 155a of the upper gasket 150a. Thus, the integral sealing body 110 is completed. Then, the battery can 2 is sealed such that the peripheral-edge folded portion 122 of the sealing plate 120 is welded along an inner periphery of an upper end 11 of the battery can 2 by laser light beam or the like. The sealing structure of the cylindrical battery is also disclosed in, for example, Japanese Unexamined Patent Application Publication No. 2016-38991.

In the sealing body 110 according to the conventional example illustrated in FIG. 6 and FIG. 8, the column-shaped inserting portion 132 of the electrode terminal 130 has been inserted through the circular openings and holes (the opening 121, the opening 141, the hole 151a, and the opening 151b) formed on the sealing plate 120, the gasket 150, and the washer 140. The protrusion 136 formed on the lower surface 133 of terminal portion 131 in the electrode terminal 130 has the circular planar shape. Thus, when a strong force is applied to the electrode terminal 130, the column-shaped inserting portion 132 rotates around the cylinder axis 100, and there is a possibly of contact between the inserting portion 132 and the gasket 150 decreasing. When contact between the inserting portion 132 and the gasket 150 decreases, there is a possibility of leakage occurring.

For example, to directly mount the tube-shaped battery 101 on a circuit board (not illustrated), in the case where a lead tab (not illustrated) is mounted on the electrode terminal 130 by such as welding, when a strong force is applied to this lead tab from outside, this force also applies to the electrode terminal 130. The strong force may be applied to the electrode terminal 130 by such as dropping of the tube-shaped battery 101. With the sealing body 110 in the conventional tube-shaped battery 101, in such a case, there is a possibility that the contact between the inserting portion 132 and the gasket 150 decreases.

An object of the present disclosure is to provide a sealing body of a tube-shaped battery and a tube-shaped battery, in which leakage due to rotation of an electrode terminal can be prevented and sealability is further improved.

SUMMARY

This patent specification describes a sealing body for sealing an upper opening of a battery can, in a tube-shaped battery formed by sealing a power generating element in the battery can having a tube shape with a closed bottom having a lower side as a bottom portion, the sealing body including: an electrode terminal including an inserting portion extending downward in a columnar shape on a lower surface of a flat plate-shaped terminal portion; a flat plate-shaped metallic sealing plate that has a plane shape that is closely disposed to an inner peripheral surface of an opening of the battery can, the sealing plate being formed with an opening that communicates with an upper surface and a lower surface; and a gasket made of a resin having an electrical insulating property, the gasket including an upper plate portion and a lower plate portion in surface contact with each of an upper surface and a lower surface of the sealing plate and a shaft portion having a tubular hollow shape inserted through the opening of the sealing plate and communicating with the upper plate portion and the lower plate portion, wherein a flat plate-shaped stepped portion is formed in a plane area of the lower surface of the terminal portion, the inserting portion extends downward from a lower surface of the stepped portion, the lower surface of the stepped portion is formed with a protrusion with a non-circular plane shape projecting downward and annularly going around the inserting portion, the gasket includes an upper protruding portion that has a non-circular plane shape and projects downward formed on a lower surface of the upper plate portion and a lower recessed portion that has a non-circular plane shape and opens upward formed on an upper surface of the lower plate portion, a sealing-plate recessed portion is formed including a plane shape that engages with the upper protruding portion in a periphery of the opening on the upper surface of the sealing plate, and a sealing-plate protruding portion that engages with the recessed portion of the lower plate portion is formed in a periphery of the opening on the lower surface of the sealing plate, and in the gasket, the inserting portion is inserted through the shaft portion, the protrusion is buried in an upper surface of the upper plate portion, and the upper protruding portion and the lower recessed portion in a compressed state are closely disposed on an inner surface of the sealing-plate recessed portion and an outer surface of the sealing-plate protruding portion.

The present disclosure may provide a sealing body of a tube-shaped battery, wherein a plane area of the upper protruding portion includes a plane area of the stepped portion. Further, the present disclosure may describe a sealing body of a tube-shaped battery, wherein the gasket is formed of an upper gasket including the upper protruding portion and a lower gasket disposed to an opposite side of the upper gasket sandwiching the sealing plate, the shaft portion is formed in at least one of the upper gasket and the lower gasket, the upper protruding portion is formed on a side adjacent to the sealing plate of the upper gasket, and the lower recessed portion is formed on a side adjacent to the sealing plate of the lower gasket. The present disclosure may describe a sealing body of a tube-shaped battery wherein on the lower surface of the sealing plate, the sealing-plate protruding portion is formed as a back side of the sealing-plate recessed portion.

In the scope of the present disclosure, a tube-shaped battery including: a battery can having a tube shape with a closed bottom having a lower side as a bottom portion; a power generating element disposed inside the battery can; and a sealing body for sealing an opening of the battery can is included. The sealing body includes an electrode terminal including an inserting portion extending downward in a columnar shape on a lower surface of a flat plate-shaped terminal portion, a flat plate-shaped metallic sealing plate that has a plane shape that is closely disposed to an inner peripheral surface of an opening of the battery can, the sealing plate being formed with an opening that communicates with an upper surface and a lower surface, and a gasket made of a resin having an electrical insulating property, the gasket including an upper plate portion and a lower plate portion in surface contact with each of an upper surface and a lower surface of the sealing plate and a shaft portion having a tubular hollow shape inserted through the opening of the sealing plate and communicating with the upper plate portion and the lower plate portion, the inserting portion extends downward from a lower surface of the stepped portion formed in a flat plate-shape in the lower surface of the terminal portion, the lower surface of the stepped portion is formed with a protrusion with a non-circular plane shape projecting downward and annularly going around the inserting portion, the gasket includes an upper protruding portion that has a non-circular plane shape and projects downward formed on a lower surface of the upper plate portion and a lower recessed portion that has a non-circular plane shape and opens upward formed on an upper surface of the lower plate portion, a sealing-plate recessed portion is formed including a plane shape that engages with the upper protruding portion in a periphery of the opening on the upper surface of the sealing plate, and a sealing-plate protruding portion that engages with the recessed portion of the lower plate portion is formed in a periphery of the opening on the lower surface of the sealing plate, in the gasket, the inserting portion is inserted through the shaft portion, the protrusion is buried in an upper surface of the upper plate portion, and the upper protruding portion and the lower recessed portion in a compressed state are closely disposed on an inner surface of the sealing-plate recessed portion and an outer surface of the sealing-plate protruding portion, and a lower end surface of the inserting portion is electrically coupled to the power generating element.

DESCRIPTION OF EMBODIMENTS

Figure 1:
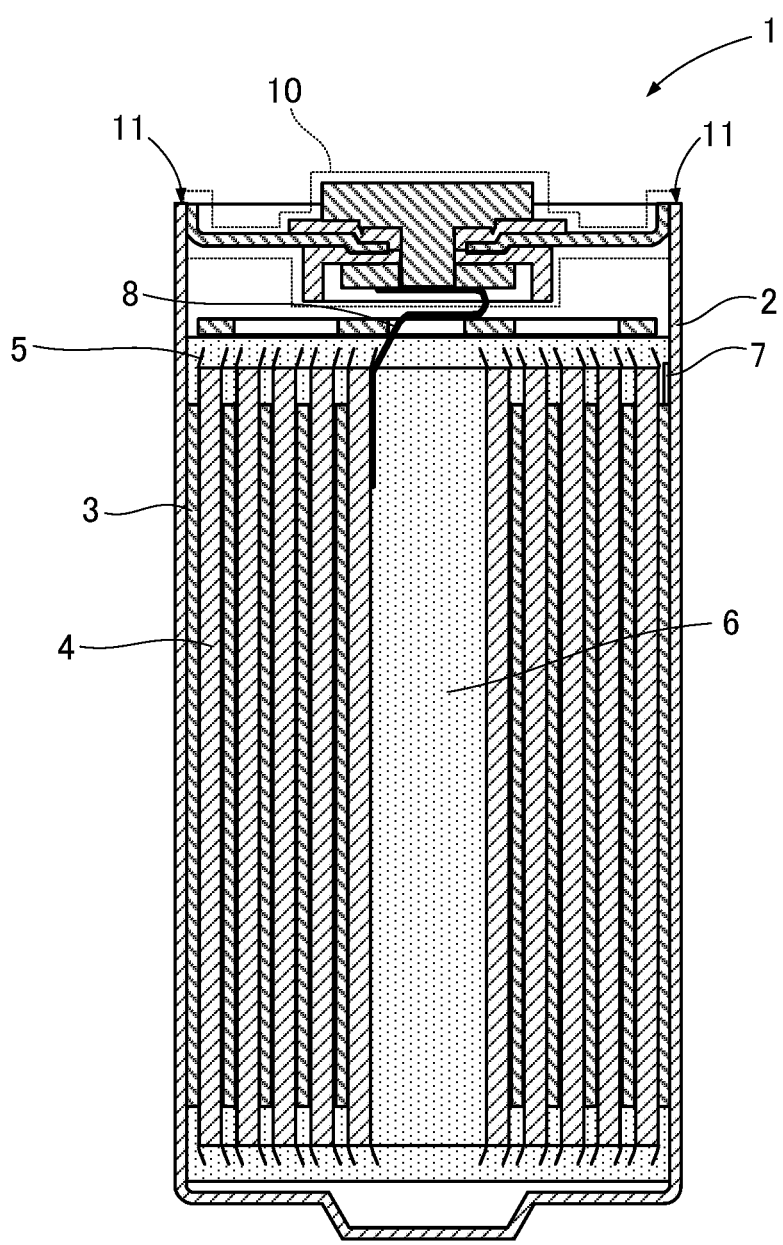
FIG. 1 is a vertical cross-sectional view illustrating an exemplary tube-shaped battery including a sealing body according to an embodiment of the present disclosure.

The following describes embodiments of this disclosure with reference to the attached drawings. Like reference numerals designate identical or corresponding elements in the drawings used for the following description, and thus description of such elements may be omitted. In some drawings, unnecessary reference numerals may be omitted in the description.

===Structure of Tube-Shaped Battery===

FIG. 1 illustrates an exemplary tube-shaped battery 1 including a sealing body 10 according to the embodiment of this disclosure, as a vertical cross-sectional view. The tube-shaped battery 1 illustrated in FIG. 1 is a spiral-type lithium primary battery, and has a basic structure in which a positive electrode 3, a negative electrode 4, a separator 5, and a non-aqueous organic electrolyte 6 as power generating elements are housed in a battery can 2 that doubles as a positive electrode current collector, and an opening of the battery can 2 is sealed with the sealing body 10. The positive electrode 3 is formed such that a slurry positive electrode material is applied over, for example, a lath plate made of stainless steel, and then, the applied plate is cut off into a predetermined size to be dried. The negative electrode 4 is a plate-shaped lithium metal or a lithium alloy (hereinafter referred to as a negative-electrode lithium 4). Then, the negative-electrode lithium 4 and the positive electrode 3 are disposed opposing via the separator 5 formed of, for example, a microporous membrane made of polyolefin to be formed to a strip-shaped electrode body. Then, this strip-shaped electrode body, in a wound state, is inserted into the battery can 2. Inside of the battery can 2 sealed with the sealing body 10 is filled with the non-aqueous organic electrolyte 6 in which lithium salt is dissolved in a non-aqueous solvent. The negative-electrode lithium 4 is coupled to the lower surface 35 of the inserting portion 32 in an electrode terminal 30 described later via a negative electrode tab 8. The positive electrode 3 is coupled to an inner surface of the battery can 2 via a positive electrode tab 7. This disclosure relates to the sealing body 10 of the tube-shaped battery 1, and is applicable to not only the cylindrical tube-shaped battery 1 illustrated in FIG. 1, but also a tube-shaped battery 1 having other shapes such as a cornered cylinder type. Needless to say, the tube-shaped battery 1 to which this disclosure is applied includes a primary battery and a secondary battery. This disclosure can be also applied to a tube-shaped battery 1 having another format such as an alkaline battery.

===Structure of Sealing Body===

Figure 2:
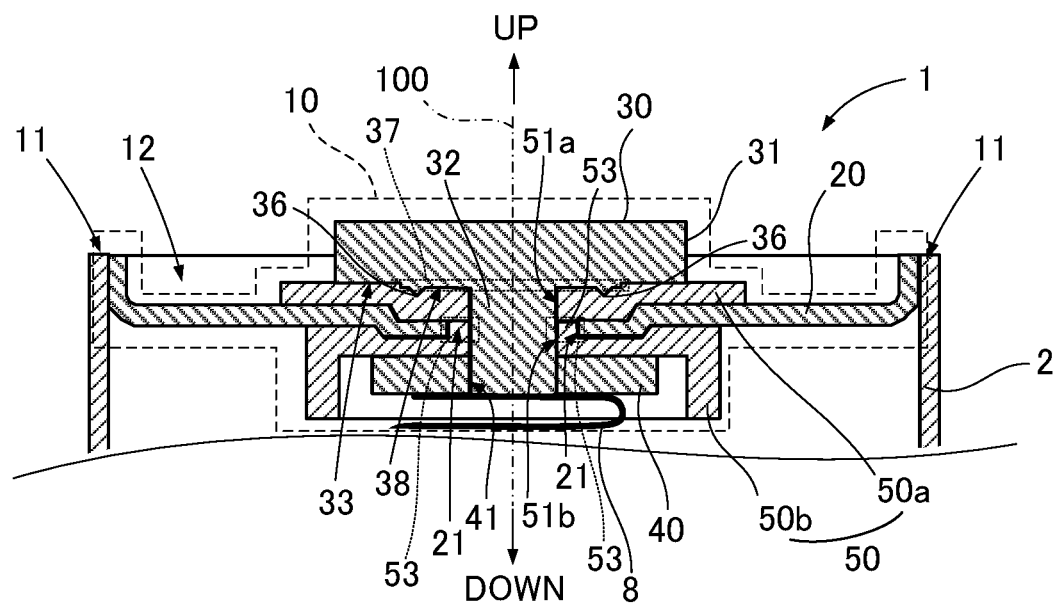
FIG. 2 is a vertical cross-sectional view of the sealing body according to the above-described embodiment.

As illustrated in FIG. 1, an opening end of the battery can 2 is sealed with the sealing body 10. FIG. 2 illustrates a vertical cross-sectional view where an upper end side of the tube-shaped battery 1 is enlarged. As illustrated in FIG. 2, the sealing body 10 in this embodiment includes a circular plate-shaped sealing plate 20 made of metal, a gasket 50 made of a resin having an electrical insulating property, the electrode terminal 30, and a washer 40, and these components are disposed in the up-down direction to be coaxial with the cylinder axis 100. The gasket 50 illustrated here is also configured of two members of an upper gasket 50a and a lower gasket 50b which are to be disposed in the up-down direction sandwiching the sealing plate 20. In this example, a shaft portion 53 inserted through an opening 21 of the sealing plate 20 is formed on the lower gasket 50b. The electrode terminal 30 has a disc-shaped terminal portion 31 and a column-shaped inserting portion 32 provided to protrude on a lower surface 33 of this terminal portion 31. In centers of the upper gasket 50a, the lower gasket 50b, and the washer 40, holes (51a and 51b) and an opening 41 through which the inserting portion 32 of the electrode terminal 30 is inserted are provided. Then, while the shaft portion 53 of the lower gasket 50b is inserted through the opening 21 of the sealing plate 20, the inserting portion 32 of the electrode terminal 30 is sequentially inserted through, from above, the hole 51a of the upper gasket 50a and the hole 51b of the lower gasket 50b, and the opening 41 of the washer 40, and the inserting portion 32 is pressed in a direction of the axis 100 to crimp the upper gasket 50a, the sealing plate 20, the lower gasket 50b, and the washer 40. This assembles the sealing body 10 as one integral component. The sealing plate 20 and the washer 40 can be formed of a metallic material such as an iron material and a stainless-steel strip by press forming. The upper gasket 50a and the lower gasket 50b can be formed of a synthetic resin having thermoplasticity and an electrical insulating property, such as polypropylene and polyphenylene sulfide.

In the sealing body 10 in this embodiment, a circular plate-shaped stepped portion 37 is formed in an area of the lower surface 33 of the circular plate-shaped terminal portion 31 in the electrode terminal 30. The inserting portion 32 is formed on a lower surface 38 of this stepped portion 37. Thus, the electrode terminal 30 has a three-step cylindrical shape that gradually reduces its diameter downward, with the terminal portion 31, the stepped portion 37, and the inserting portion 32. The stepped portion 37 in this embodiment is a circular plate-shape, but its planar shape may be any shape insofar as it is a flat plate-shape such as a rectangular flat plate-shape. Then, a protrusion 36 that circles around the inserting portion 32 is formed on the lower surface 38 of this stepped portion 37.

Figure 3A:
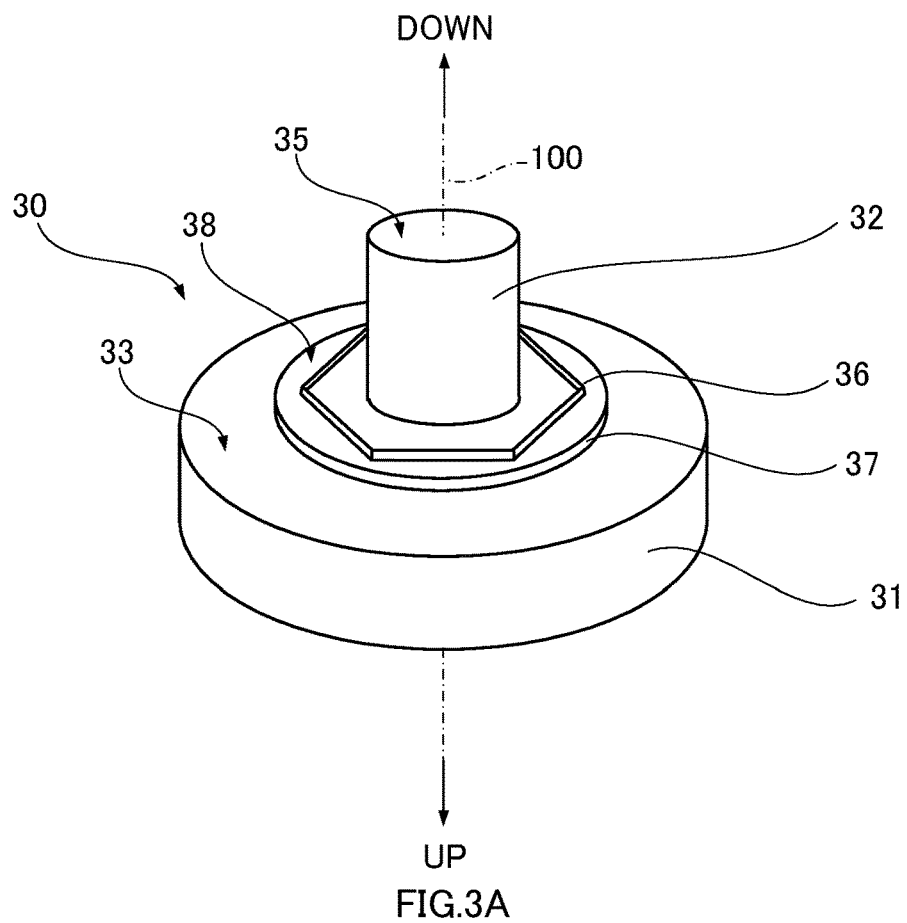
FIG. 3A is a view illustrating a structure of an electrode terminal that configures the sealing body according to the above-described embodiment.
Figure 3B:
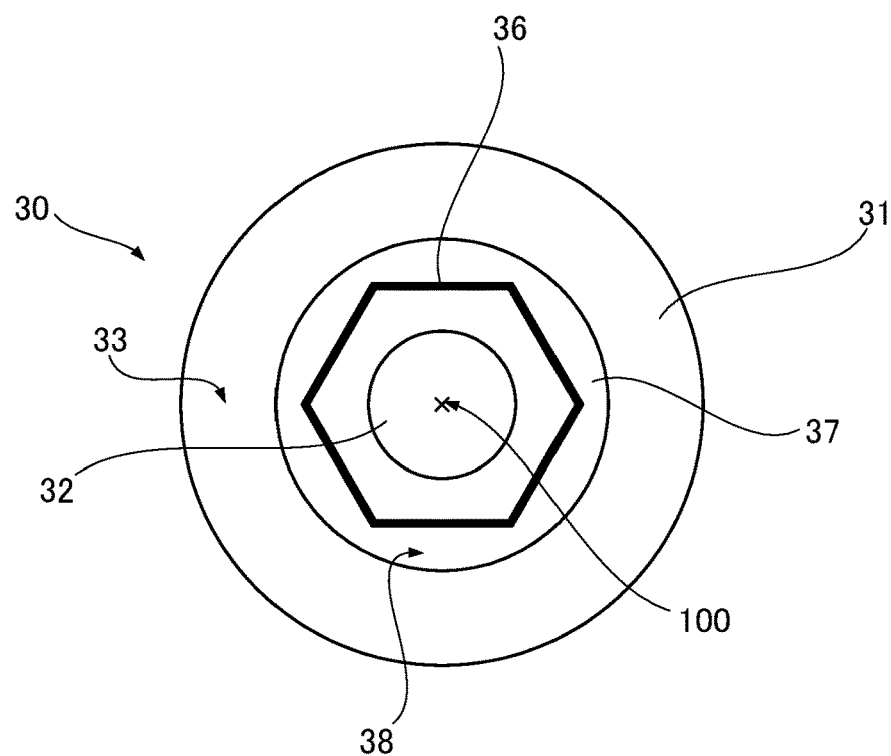
FIG. 3B is a view illustrating the structure of the electrode terminal that configures the sealing body according to the above-described embodiment.

FIG. 3A and FIG. 3B illustrate a structure of the electrode terminal 30 that configures the sealing body 10 according to this embodiment. FIG. 3A is a perspective view of when the electrode terminal 30 is viewed from below, and FIG. 3B is a plan view of when the electrode terminal 30 is viewed from below. As illustrated in FIG. 3A and FIG. 3B, the protrusion 36 that circles around the inserting portion 32 has a planar shape that is non-circular, and in this example is formed into an annular shape having a regular-hexagonal contour that is coaxial with the inserting portion 32. When the electrode terminal 30 is crimped to assemble the sealing body 10, as illustrated in FIG. 2, the protrusion 36 of the terminal portion 31 digs into an upper surface of the upper gasket 50a made of a resin, and the protrusion 36 is buried in the upper gasket 50a. At this time, since the planar shape of the protrusion 36 is non-circular, the electrode terminal 30 and the upper gasket 50a do not rotate relatively even when a force around the cylinder axis 100 is, at least, applied to the terminal portion 31.

On the other hand, by simply providing the protrusion 36 having the non-circular planar shape on the lower surface 33 of the terminal portion 31, there is a possibility that the electrode terminal 30 and the upper gasket 50a integrate and rotate with respect to the sealing plate 20 and the lower gasket 50b. The sealing body 10 according to this embodiment has a structure for preventing the sealing plate 20 and the lower gasket 50b from relatively rotating with respect to the upper gasket 50a.

Figure 4:
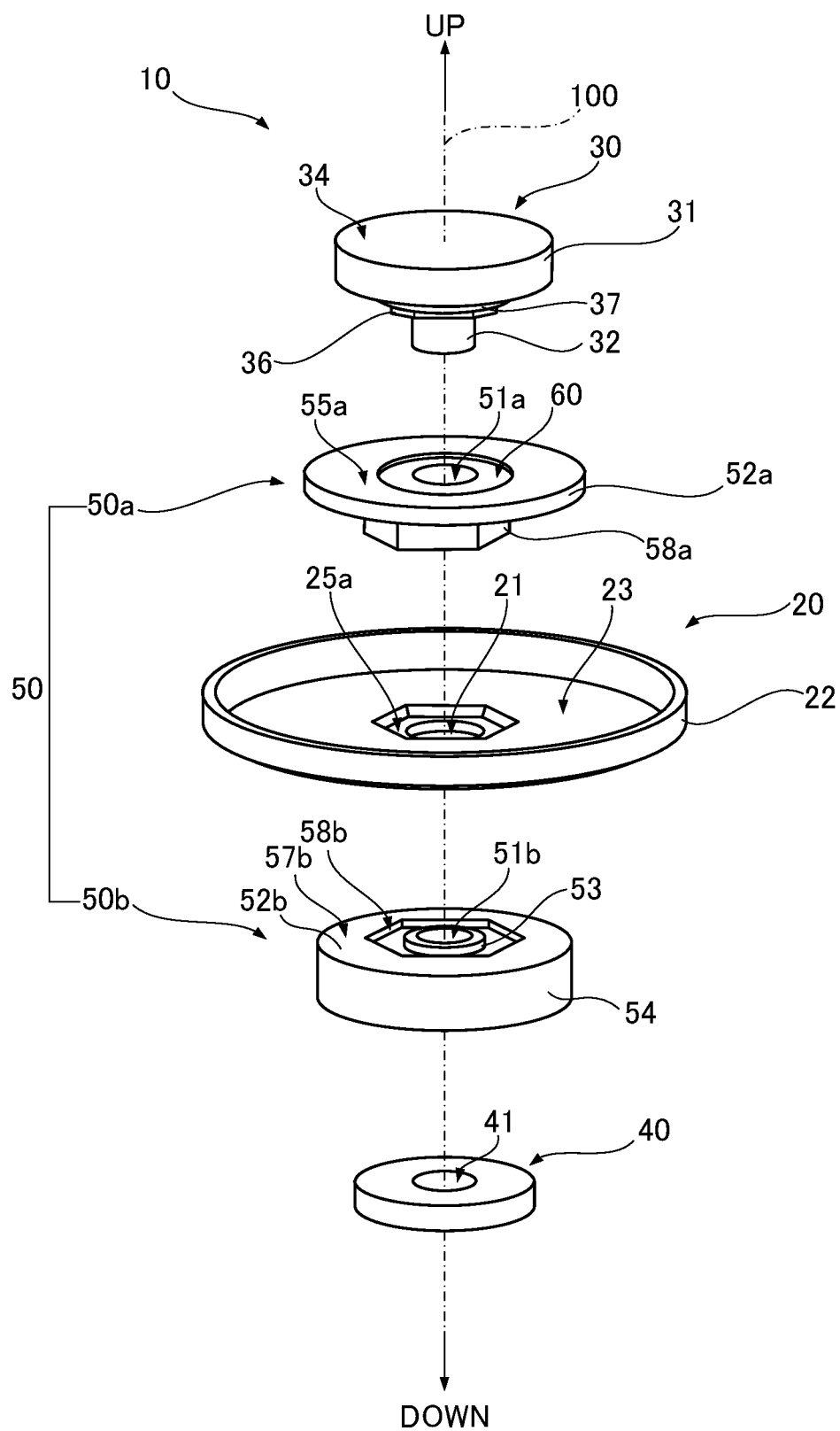
FIG. 4 is an exploded perspective view of the sealing body according to the above-described embodiment.
Figure 5:
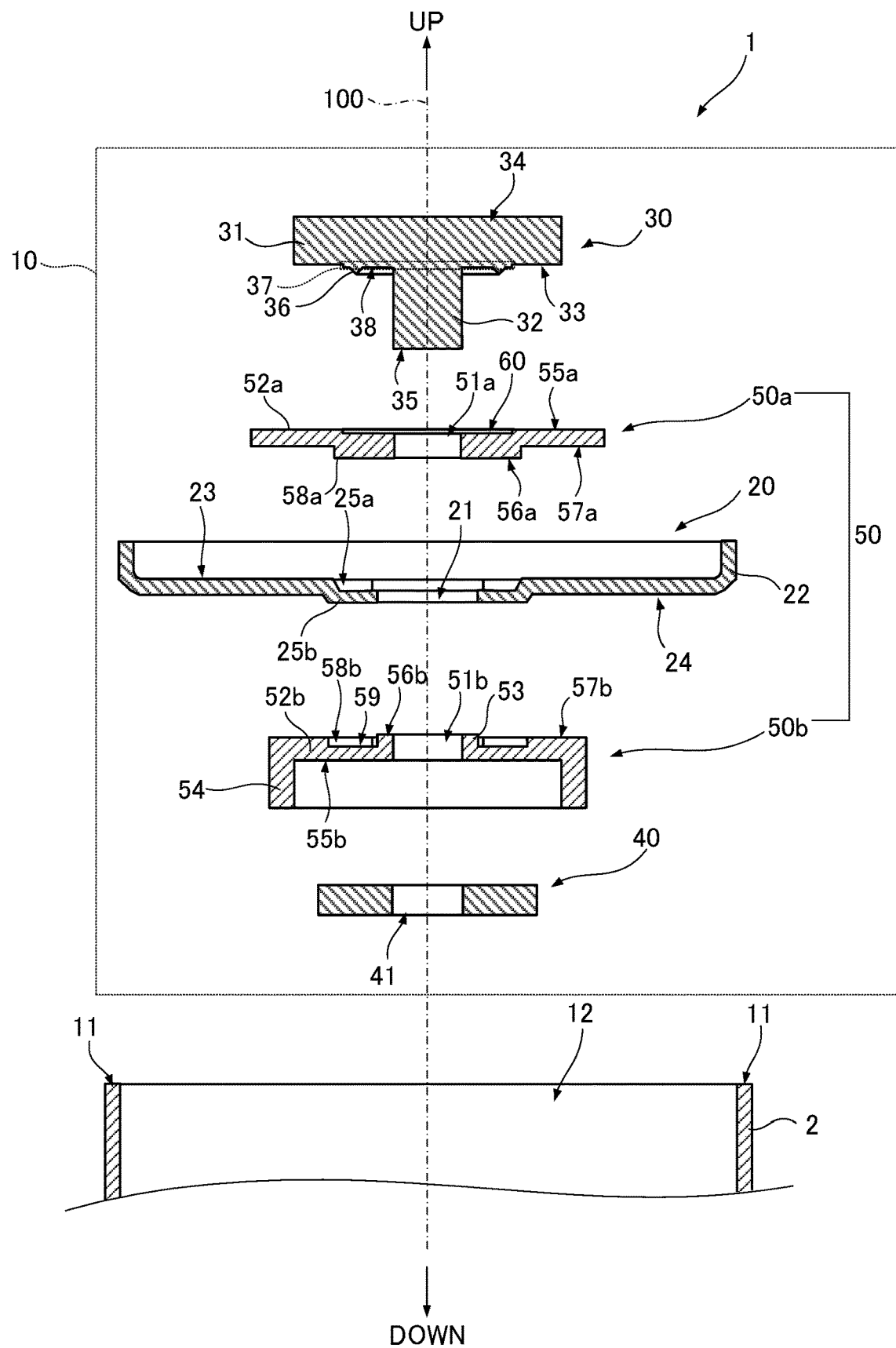
FIG. 5 is a vertical cross-sectional view when the sealing body according to the above-described embodiment has been exploded.

FIG. 4 illustrates an exploded perspective view of when the sealing body 10 according to this embodiment is viewed from above. FIG. 5 illustrates a vertical cross-sectional view of when the sealing body 10 is disassembled into each member. The following describes a more detailed structure of the sealing body 10 with reference to FIG. 4 and FIG. 5. First, the upper gasket 50a has an upper protruding portion 58a having a tubular hollow shape on a lower surface 57a of an upper circular plate portion 52a. This upper protruding portion 58a has a planar shape that is non-circular, and is hexagonal in this example. In the center of the upper gasket 50a, the hole 51a that communicates with an upper surface 55a of the upper circular plate portion 52a and a lower end surface 56a of the upper protruding portion 58a is formed.

In this embodiment, on the upper surface 55a of the upper circular plate portion 52a of the upper gasket 50a, an upper recessed portion 60 that engages with the stepped portion 37 of the electrode terminal 30 is formed. This upper recessed portion 60 is for adjusting a height in the up-down direction after the assembly of the sealing body 10. The upper recessed portion 60 is not always a necessary configuration. In this embodiment, when sealing performances of the sealing body 10 and the sealing body 110 are compared with one another, to align assembly conditions of both sealing bodies (10 and 110), the upper recessed portion 60 that engages with the stepped portion 37 is provided. Specifically, the upper recessed portion 60 is provided so that both sealing bodies (10 and 110) have the same height, when the sealing bodies (10 and 110) are assembled by compressing the upper surfaces (34 and 134) and the lower surfaces (33 and 133) of the terminal portions (31 and 131) in the electrode terminals (30 and 130) in the up-down direction with the same pressure. The upper recessed portion 60 has a depth equal to or less than a height of the stepped portion 37 so that the lower surface 38 of the stepped portion 37 surely comes into contact with a bottom of the upper recessed portion 60. Here, the depth of the upper recessed portion 60 is set to be the same as the height of the stepped portion 37.

The circular plate-shaped sealing plate 20 has a peripheral edge on which a peripheral-edge folded portion 22 bending upward is formed, and has the circular opening 21 in the center of the circular plate. The sealing plate 20 has an upper surface 23 that receives the lower surface 57a of the upper circular plate portion 52a. Thus, on the periphery of the opening 21, a recessed portion (hereinafter referred to as a sealing-plate recessed portion 25a) having a hexagonal planar shape that engages with the upper protruding portion 58a of the upper gasket 50a is provided. A lower surface 24 of the sealing plate 20 is formed with a protruding portion (hereinafter referred to as a sealing-plate protruding portion 25b) having a hexagonal planar shape that is formed by providing the above-described sealing-plate recessed portion 25a. Then, the sealing plate 20 having such a structure can be formed by metal stamping. The sealing-plate recessed portion 25a has a shape dimension that is set according to the material of the upper gasket 50a, and the shape and the projecting dimension of the upper protruding portion 58a.

The lower surface 24 of the sealing plate 20 is received with the upper surface 57b of the lower gasket 50b. Then, as illustrated in FIG. 5, the lower gasket 50b has a flat cup shape with the upside as a bottom portion. A sidewall portion 54 vertically provided downward is formed in the periphery of a lower circular plate portion 52b having a circular planar shape corresponding to the bottom portion. On the peripheral area of the hole 51b, a recessed portion (hereinafter referred to as a lower recessed portion 58b) corresponding to the sealing-plate protruding portion 25b is provided. Then, the shaft portion 53 having a hollow cylindrical shape inserted through the opening 21 of the sealing plate 20 is formed projecting upward on a bottom surface 59 of this lower recessed portion 58b. In this shaft portion 53, the hole 51b from an upper end surface 56b to a lower surface 55b of the lower circular plate portion 52b is formed. The shape and the depth of the lower recessed portion 58b can be determined according to the shape and the projecting dimension of the sealing-plate protruding portion 25b.

In the sealing body 10 formed of each of the above-described components, in the upper gasket 50a and the lower gasket 50b, and the sealing plate 20, the upper protruding portion 58a engages with the sealing-plate recessed portion 25a, and the sealing-plate protruding portion 25b engages with the lower recessed portion 58b. When the shaft portion 53 of the lower gasket 50b is inserted through the opening 21 of the sealing plate 20, and the inserting portion 32 of the electrode terminal 30 is pressed to be compressed in the up-down direction in a state inserted through the hole 51a of the upper gasket 50a, the hole 51b of the lower gasket 50b, and the opening 41 of the washer 40, the upper protruding portion 58a having a non-circular planar shape in the upper gasket 50a and the lower recessed portion 58b having a non-circular planar shape in the lower gasket 50b are compressed to deform. Then, an outer surface of the upper protruding portion 58a closely contacts an inner surface of the sealing-plate recessed portion 25a, and an inner surface of the lower recessed portion 58b closely contacts an outer surface of the sealing-plate protruding portion 25b. Thus, the gasket 50 does not turn with respect to the sealing plate 20 strongly welded to the battery can 2 even when the force around the axis 100 is applied to the electrode terminal 30.

Needless to say, the close contact of the upper protruding portion 58a and the lower recessed portion 58b with the sealing-plate recessed portion 25a and the sealing-plate protruding portion 25b also provides an effect that further improves a sealing performance of the battery can 2 with the sealing body 10. Further, since the protrusion 36 of the electrode terminal 30 is buried in the upper circular plate portion 52a, this protrusion 36 becomes a weir and closes a leakage path that passes through the inserting portion 32 from above to below to head outward of the tube-shaped battery 1 through a boundary surface between the lower surface 33 of the terminal portion 31 and the upper surface 55a of the upper circular plate portion 52a. This can also further reduce a possibility of leakage.

Figure 8:
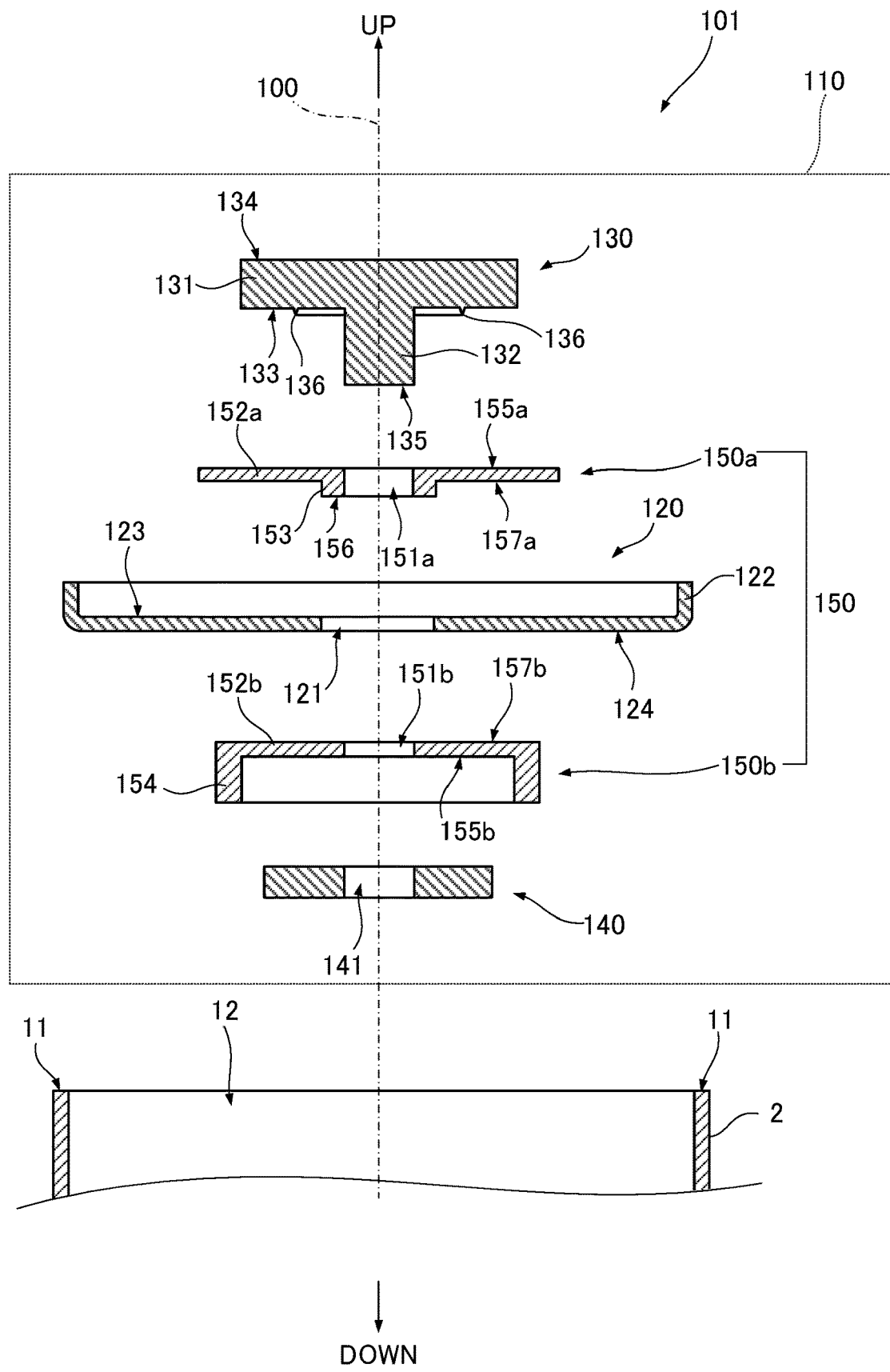
FIG. 8 is a vertical cross-sectional view of when the sealing body according to the above-described conventional example has been disassembled.

Now, in the sealing body 10 of this embodiment, the sealing-plate recessed portion 25a that engages with the upper protruding portion 58a of the upper gasket 50a is formed on the upper surface 23 of the sealing plate 20, and the sealing-plate protruding portion 25b that engages with the lower recessed portion 58b of the lower gasket 50b is formed on the lower surface 24 of the sealing plate 20. Thus, with the sealing body 10, compared to the sealing body 110 according to the conventional example illustrated in FIG. 6 and FIG. 8, the gasket 50 has a large thickness, that is, a large thickness between the upper surface 55a of the upper gasket 50a and the lower surface 55b of the lower gasket 50b. In the case where the shape of the lower surface 33 of the terminal portion 31 of the electrode terminal 30 is a shape without the stepped portion 37, similar to the conventional sealing body 110, in assembling the sealing body 10, this thick gasket 50 would be compressed between the lower surface 33 of the terminal portion 31 of the electrode terminal 30 and the washer 40. Thus, the gasket 50 is not significantly compressed in the up-down direction (does not become thin), and deformation in a diameter expanding direction on the upper protruding portion 58a of the upper gasket 50a and the shaft portion 53 of the lower gasket 50b decreases. As a result, there is a possibility that a degree of close contact of the upper protruding portion 58a with an inner peripheral surface of the sealing-plate recessed portion 25a in the sealing plate 20, or a degree of close contact of the shaft portion 53 with an inner peripheral surface of the opening 21 of the sealing plate 20 decreases. When the gasket 50 is not further significantly compressed in the up-down direction, there is a possibility that a force with which the gasket 50 presses the sealing plate 20 in the up-down direction also decreases. Thus, in the sealing body 10 of this embodiment, the stepped portion 37 is provided on the lower surface 33 of the terminal portion 31 of the electrode terminal 30, and this stepped portion 37 is buried in the gasket 50 additionally by its volume, and the gasket 50 is configured to be further significantly compressed.

In this embodiment, when the sealing body 10 is viewed from above, the stepped portion 37 of the electrode terminal 30 is included in a planar area of the upper protruding portion 58a of the upper gasket 50a. Thus, when the stepped portion 37 presses the upper surface of the upper gasket 50a downward, a formation area of the upper protruding portion 58a is selectively compressed than other areas, and the upper protruding portion 58a becomes likely to further deform in the diameter expanding direction. That is, an outer peripheral surface of the upper protruding portion 58a further strongly and closely contacts the inner peripheral surface of the sealing-plate recessed portion 25a in the sealing plate 20, and the upper gasket 50a is configured to be less likely to rotate with respect to the sealing plate 20.

===Sealing Performance Test===

Figure 6:
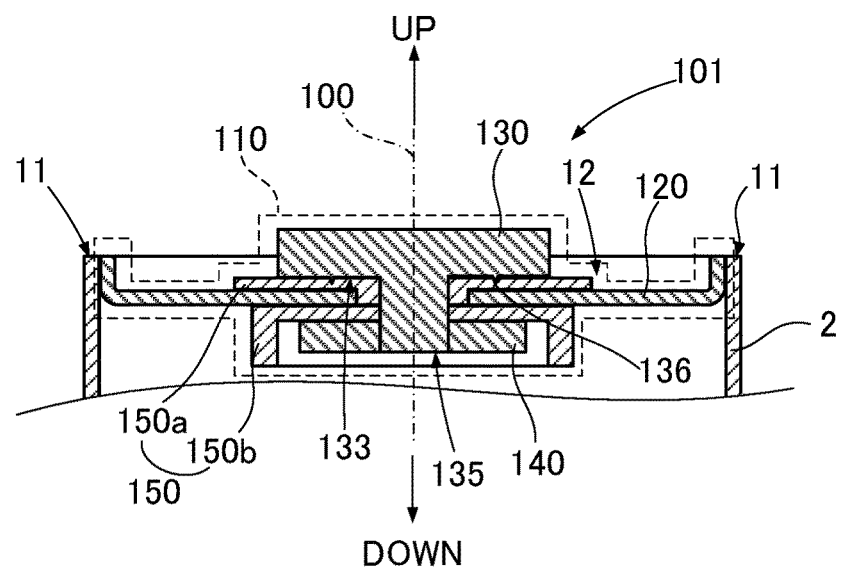
FIG. 6 is a vertical cross-sectional view illustrating a sealing body according to a conventional example.
Figure 7:
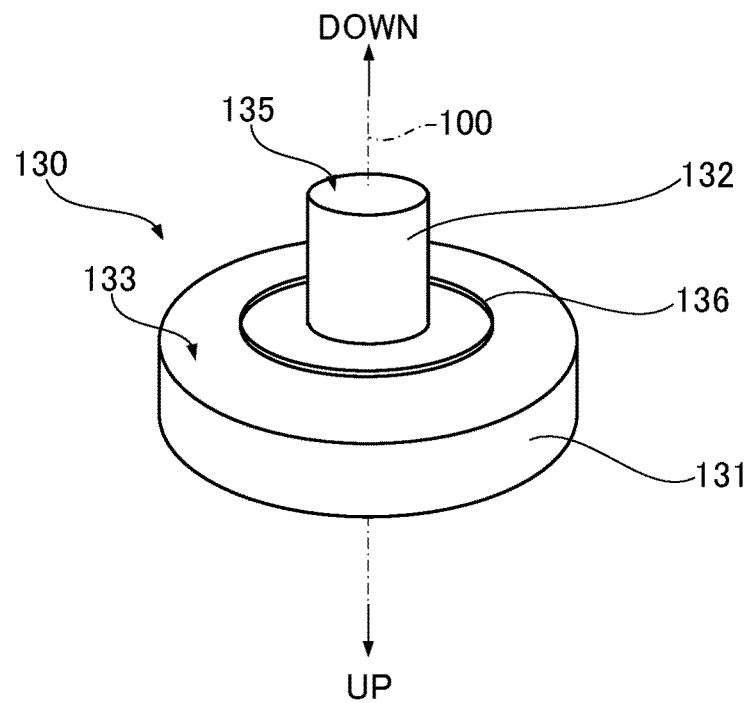
FIG. 7 is a perspective view of an electrode terminal that configures the sealing body according to the above-described conventional example.

To confirm the sealing performance of the sealing body 10 according to this embodiment, ten sealing bodies 10 according to this embodiment and ten sealing bodies 110 according to the conventional example illustrated in FIG. 6 were prepared. As described above, the height of the stepped portion 37 of the electrode terminal 30 and the depth of the upper recessed portion 60 of the upper gasket 50a in the sealing body 10 in this embodiment are set to be the same as the height in the sealing body 110 in the conventional example, when this sealing body 10 is crimped and assembled with the same strength as that of the sealing body 110 in the conventional example. Then, for the respective sealing bodies (10 and 110), sealing performance tests that relatively rotate the electrode terminals (30 and 130) with respect to the sealing plates (20 and 120) were performed. Here, jigs gripped around the sealing plates (20 and 120), and torque meters gripped around the terminal portions (31 and 131) of the electrode terminals (30 and 130). Then, the sealing plates (20 and 120) were fixed, torques around the cylinder axis 100 applied to the terminal portions (31 and 131) were increased, and then the torques of when the electrode terminals (30 and 130) started rotating were measured.

Table 1 shows a result of the above-described sealing performance test.

TABLE 1

| Sealing Body | Minimum Torque | Maximum Torque |
| --- | --- | --- |
| Embodiment | 60 N · cm | 70 N · cm |
| Conventional Example | 30 N · cm | 40 N · cm |

Table 1 shows measured torque maximum values and minimum values for ten sealing bodies 10 according to this embodiment and ten sealing bodies 110 according to the conventional example. Then, as shown in this Table 1, while in the sealing body 110 according to the conventional example the electrode terminal 130 starts rotating at a rotating torque at 30 to 40 N·cm, in the sealing body 10 according to this embodiment the electrode terminal 30 starts rotating at a rotating torque at 60 to 70 N·cm. Thus, it has been confirmed that the sealing body 10 according to this embodiment can bear up to approximately double torque than the sealing body 110 of the conventional example.

Other Embodiments

While in the sealing body 10 according to the above-described embodiment, the protrusion 36, and the engagement shape of the gasket 50 with the sealing plate 20 are a regular hexagon, the shape may be, such as polygonal or elliptical, and is not specifically limited as long as it is not a circular shape. In the above-described embodiment, considering ease of manufacturing, the protrusion 36 and the planar shape that forms the above-described engagement shape are coaxial with the cylinder axis 100, but needless to say it is not necessarily coaxial with the cylinder axis 100. The lower end of the protrusion 36 does not necessarily have a sharp shape. Considering, for example, fracture of the gasket 50, the protrusion 36 may be formed into a peripheral wall shape having a constant width from an upper end to a lower end, or the lower end may be rounded into an R shape.

In the sealing body 10 according to the above-described embodiment, the washer 40 is disposed, but the washer 40 is not necessarily required. By disposing the washer 40, however, the inserting portion 32 deformed in the diameter expanding direction with crimping fits to the inner periphery of the opening 41 of the washer 40, and the lower circular plate portion 52b of the lower gasket 50b is uniformly compressed with the washer 40. Since the inserting portion 32 is fitted to the opening 41 of the washer 40, the inserting portion 32 can be surely prevented from coming out of the holes (51a and 51b) of the gasket 50.

In the sealing body 10 according to the above-described embodiment, the shaft portion 53 is formed on the lower gasket 50b, but a shaft portion can also be formed on the upper gasket 50a. In this case, it is only necessary to cause a shaft portion projecting downward to be continuous with the lower end surface 56a of the upper protruding portion 58a. The gasket 50 may be constituted as one integral component without being constituted of the upper and lower two components. For example, when a gasket made of a resin is insert-molded with a metallic sealing plate as an inner mold, the sealing plate and the gasket can be integrally molded.

It can also be considered that the shaft portion 53 of the gasket 50 is formed into a non-circular tubular hollow shape such as a rectangular tube shape, and the planar shape of the opening 21 of the sealing plate 20 is formed into a shape that engages with the planar shape of this shaft portion 53. During inserting of the shaft portion 53 through the opening 21, however, when both planar shapes around the cylinder axis 100 do not match one another, a gap occurs between an outer peripheral surface of the shaft portion 53 and the inner peripheral surface of the opening 21, thus possibly degrading the sealability. Accordingly, it is preferable that the planar shapes of the shaft portion 53 and the opening 21 are circular.

In the above-described embodiment, the sealing-plate protruding portion 25b projecting on the lower surface 24 of the sealing plate 20 is formed such that the sealing-plate recessed portion 25a of the upper surface 23 appears on the lower surface 24. The sealing-plate protruding portion 25b, however, can also be formed such that the sealing-plate recessed portion 25a is formed by cutting the upper surface 23 of the sealing plate 20 to make a part of the lower surface 24 of the sealing plate 20 thick. Needless to say, when the sealing-plate recessed portion 25a and the sealing-plate protruding portion 25b are simultaneously formed by metal stamping, the sealing plate 20 can be manufactured at a lower price.

The above-described embodiments are intended to facilitate understanding of the present disclosure and are not in any way to be construed as limiting this disclosure. These embodiments may be modified and improved without departing from the scope of the disclosure, and equivalents thereof are also encompassed therein.

What is claimed is:

1. A sealing body for sealing an upper opening of a battery can, in a tube-shaped battery formed by sealing a power generating element in the battery can having a tube shape with a closed bottom having a lower side as a bottom portion, the sealing body comprising:
   an electrode terminal including an inserting portion extending downward in a columnar shape on a lower surface of a flat plate-shaped terminal portion;
   a flat plate-shaped metallic sealing plate that has a plane shape that is closely disposed to an inner peripheral surface of an opening of the battery can, the sealing plate being formed with an opening that communicates with an upper surface and a lower surface; and
   a gasket made of a resin having an electrical insulating property, the gasket including
      an upper plate portion and a lower plate portion in surface contact with each of an upper surface and a lower surface of the sealing plate and
      a shaft portion having a tubular hollow shape inserted through the opening of the sealing plate and communicating with the upper plate portion and the lower plate portion, wherein
   a flat plate-shaped stepped portion is formed in a plane area of the lower surface of the terminal portion,
   the inserting portion extends downward from a lower surface of the stepped portion,
   the lower surface of the stepped portion is formed with a protrusion with a non-circular plane shape projecting downward and annularly going around the inserting portion,
   the gasket includes
      an upper protruding portion that has a non-circular plane shape and projects downward formed on a lower surface of the upper plate portion and
      a lower recessed portion that has a non-circular plane shape and opens upward formed on an upper surface of the lower plate portion,
   a sealing-plate recessed portion is formed including a plane shape that engages with the upper protruding portion in a periphery of the opening on the upper surface of the sealing plate, and a sealing-plate protruding portion that engages with the recessed portion of the lower plate portion is formed in a periphery of the opening on the lower surface of the sealing plate, and
   in the gasket, the inserting portion is inserted through the shaft portion, the protrusion is buried in an upper surface of the upper plate portion, and the upper protruding portion and the lower recessed portion in a compressed state are closely disposed on an inner surface of the sealing-plate recessed portion and an outer surface of the sealing-plate protruding portion.

2. The sealing body of the tube-shaped battery according to claim 1, wherein
   a plane area of the upper protruding portion includes a plane area of the stepped portion.

3. The sealing body of the tube-shaped battery according to claim 1, wherein
   the gasket is formed of an upper gasket including the upper protruding portion and a lower gasket disposed to an opposite side of the upper gasket sandwiching the sealing plate,
   the shaft portion is formed in at least one of the upper gasket and the lower gasket,
   the upper protruding portion is formed on a side adjacent to the sealing plate of the upper gasket, and
   the lower recessed portion is formed on a side adjacent to the sealing plate of the lower gasket.

4. The sealing body of the tube-shaped battery according to claim 2, wherein
   the gasket is formed of an upper gasket including the upper protruding portion and a lower gasket disposed to an opposite side of the upper gasket sandwiching the sealing plate,
   the shaft portion is formed in at least one of the upper gasket and the lower gasket,
   the upper protruding portion is formed on a side adjacent to the sealing plate of the upper gasket, and
   the lower recessed portion is formed on a side adjacent to the sealing plate of the lower gasket.

5. The sealing body of the tube-shaped battery according to claim 1, wherein
   on the lower surface of the sealing plate, the sealing-plate protruding portion is formed as a back side of the sealing-plate recessed portion.

6. The sealing body of the tube-shaped battery according to claim 2, wherein
   on the lower surface of the sealing plate, the sealing-plate protruding portion is formed as a back side of the sealing-plate recessed portion.

7. The sealing body of the tube-shaped battery according to claim 3, wherein on the lower surface of the sealing plate, the sealing-plate protruding portion is formed as a back side of the sealing-plate recessed portion.

8. The sealing body of the tube-shaped battery according to claim 4, wherein
on the lower surface of the sealing plate, the sealing-plate protruding portion is formed as a back side of the sealing-plate recessed portion.

9. A tube-shaped battery comprising:
a battery can having a tube shape with a closed bottom having a lower side as a bottom portion;
a power generating element disposed inside the battery can; and
a sealing body for sealing an opening of the battery can, wherein
the sealing body includes
an electrode terminal including an inserting portion extending downward in a columnar shape on a lower surface of a flat plate-shaped terminal portion,
a flat plate-shaped metallic sealing plate that has a plane shape that is closely disposed to an inner peripheral surface of an opening of the battery can, the sealing plate being formed with an opening that communicates with an upper surface and a lower surface, and
a gasket made of a resin having an electrical insulating property, the gasket including an upper plate portion and a lower plate portion in surface contact with each of an upper surface and a lower surface of the sealing plate and a shaft portion having a tubular hollow shape inserted through the opening of the sealing plate and communicating with the upper plate portion and the lower plate portion,
a flat plate-shaped stepped portion is formed in a plane area of the lower surface of the terminal portion,
the inserting portion extends downward from a lower surface of the stepped portion,
the lower surface of the stepped portion is formed with a protrusion with a non-circular plane shape projecting downward and annularly going around the inserting portion,
the gasket includes an upper protruding portion that has a non-circular plane shape and projects downward formed on a lower surface of the upper plate portion and a lower recessed portion that has a non-circular plane shape and opens upward formed on an upper surface of the lower plate portion,
a sealing-plate recessed portion is formed including a plane shape that engages with the upper protruding portion in a periphery of the opening on the upper surface of the sealing plate, and a sealing-plate protruding portion that engages with the recessed portion of the lower plate portion is formed in a periphery of the opening on the lower surface of the sealing plate,
in the gasket, the inserting portion is inserted through the shaft portion, the protrusion is buried in an upper surface of the upper plate portion, and the upper protruding portion and the lower recessed portion in a compressed state are closely disposed on an inner surface of the sealing-plate recessed portion and an outer surface of the sealing-plate protruding portion, and
a lower end surface of the inserting portion is electrically coupled to the power generating element.

* * * * *